May 19, 1970  T. MADLAND ET AL  3,512,484
ALL-DOOR RAILROAD CAR
Filed Oct. 6, 1967  7 Sheets-Sheet 1
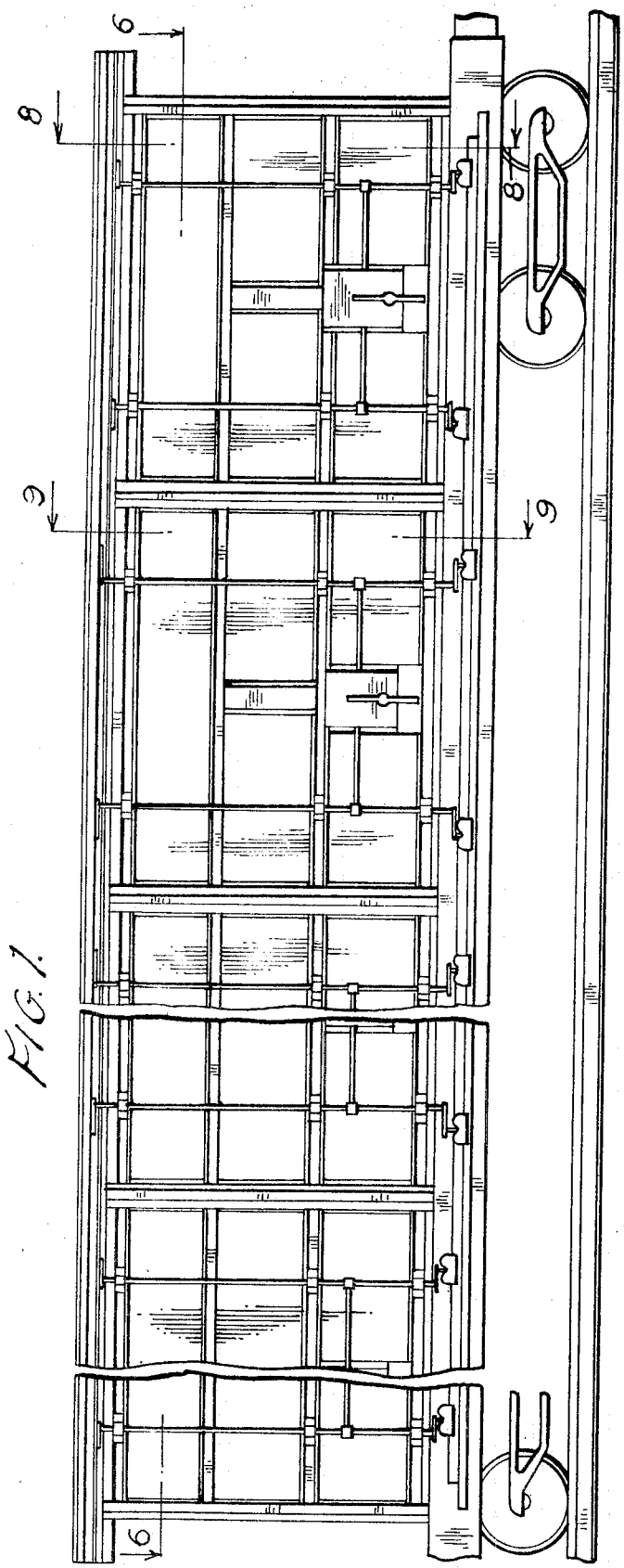
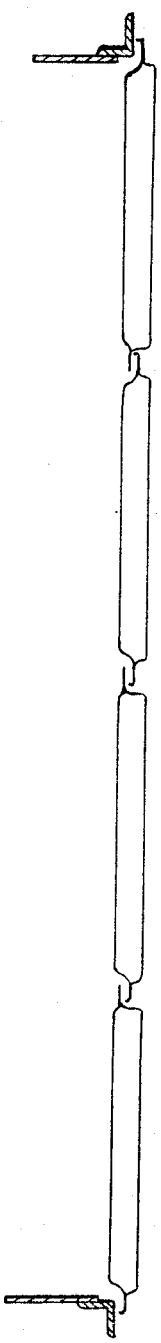
INVENTORS
THORVALD MADLAND AND
IRVING D. ROSS, JR.
BY Fay, Sharpe & Mulholland
ATTORNEYS

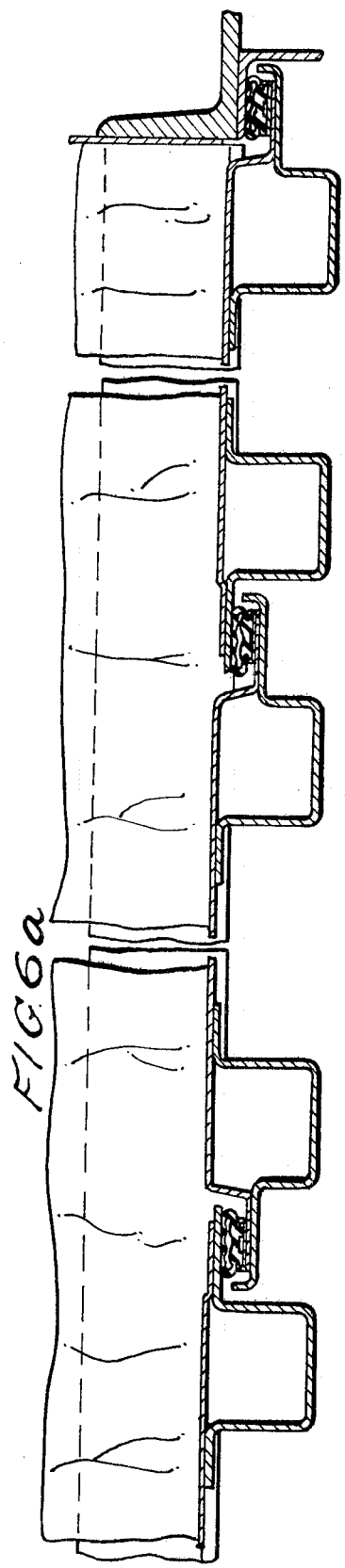
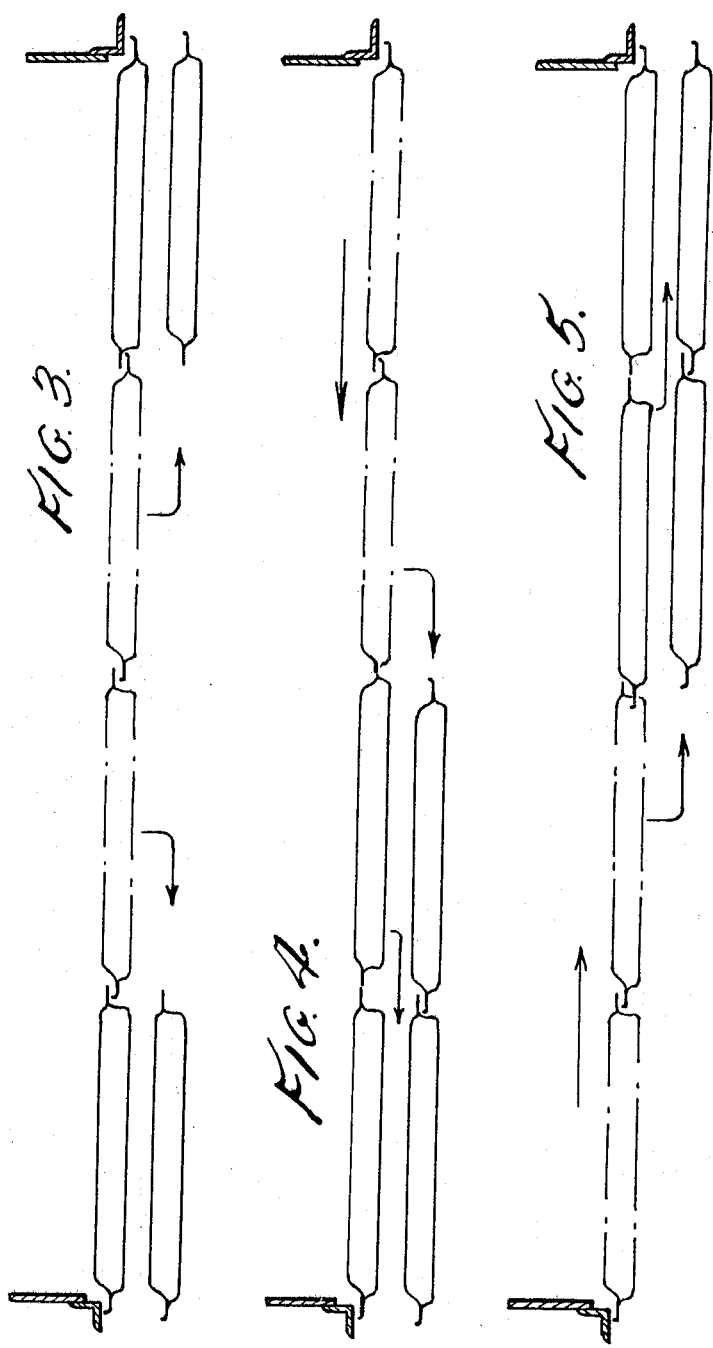

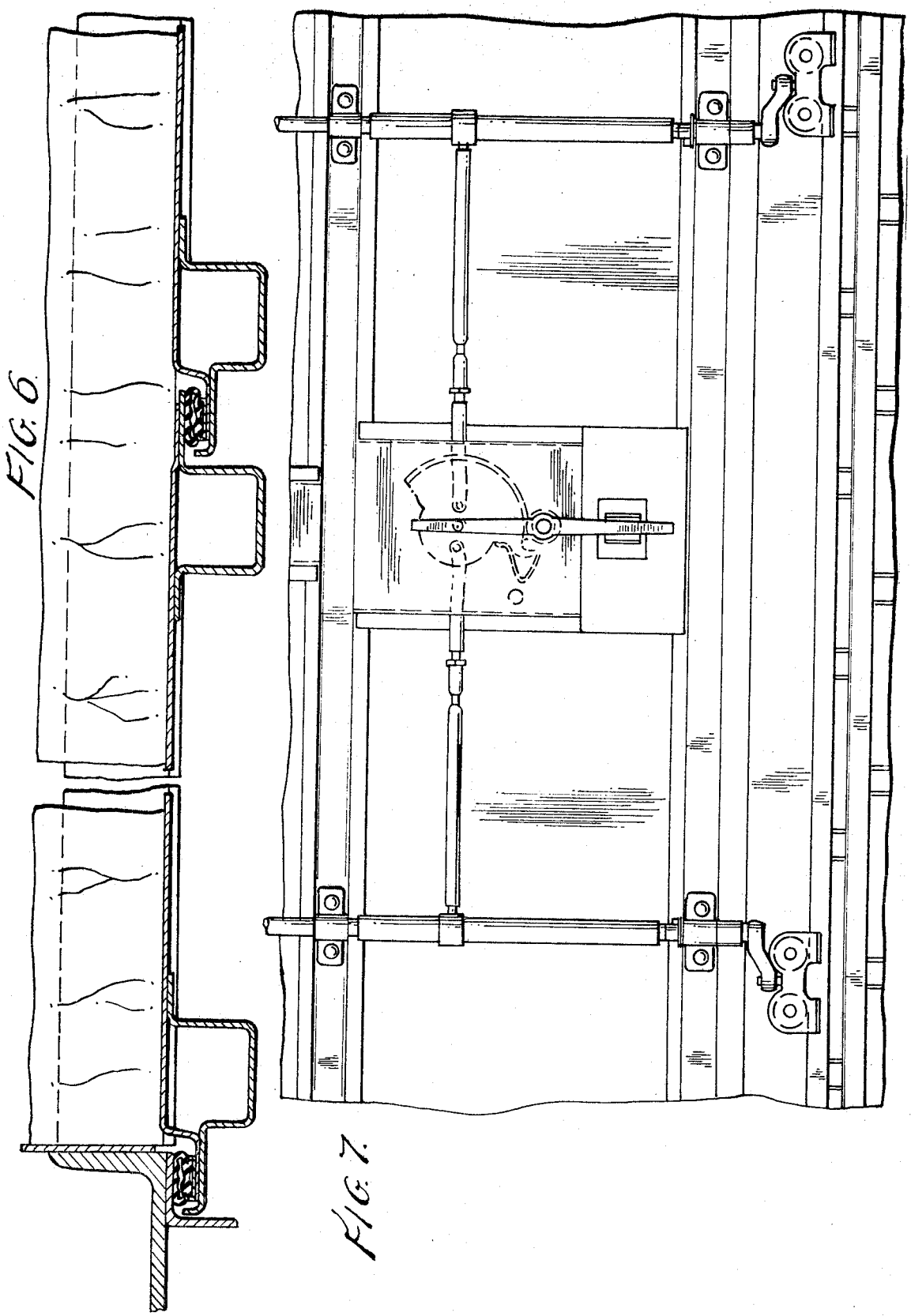

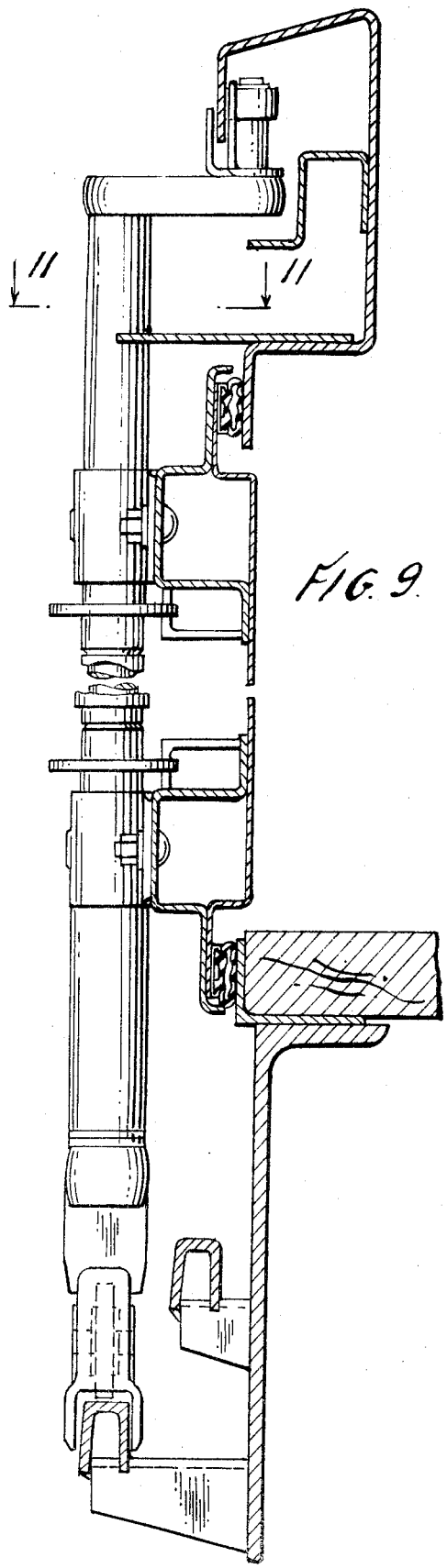
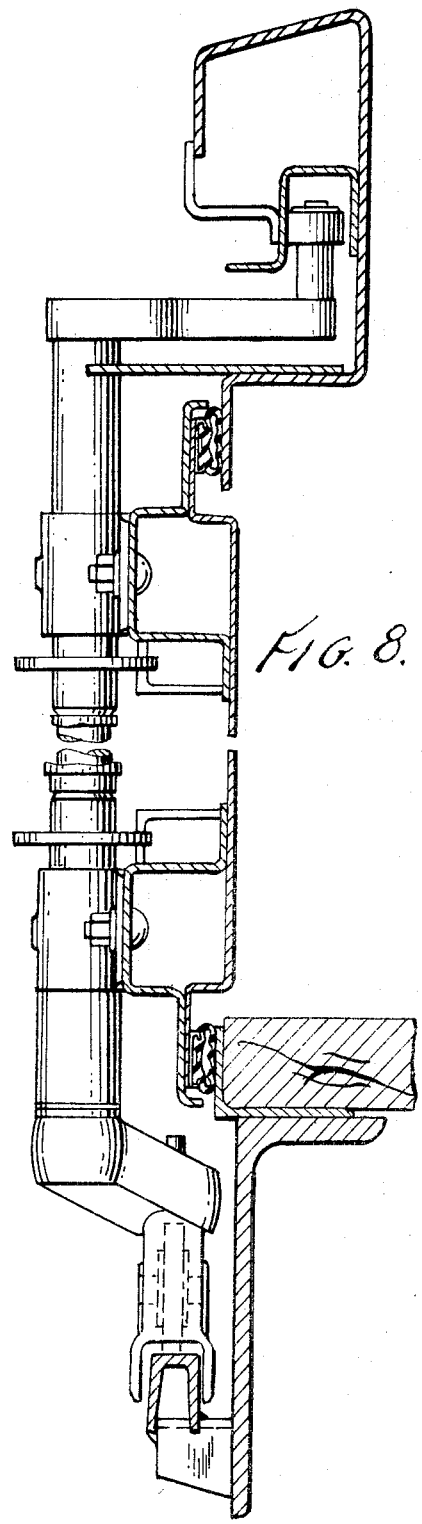
FIG. 9
FIG. 8

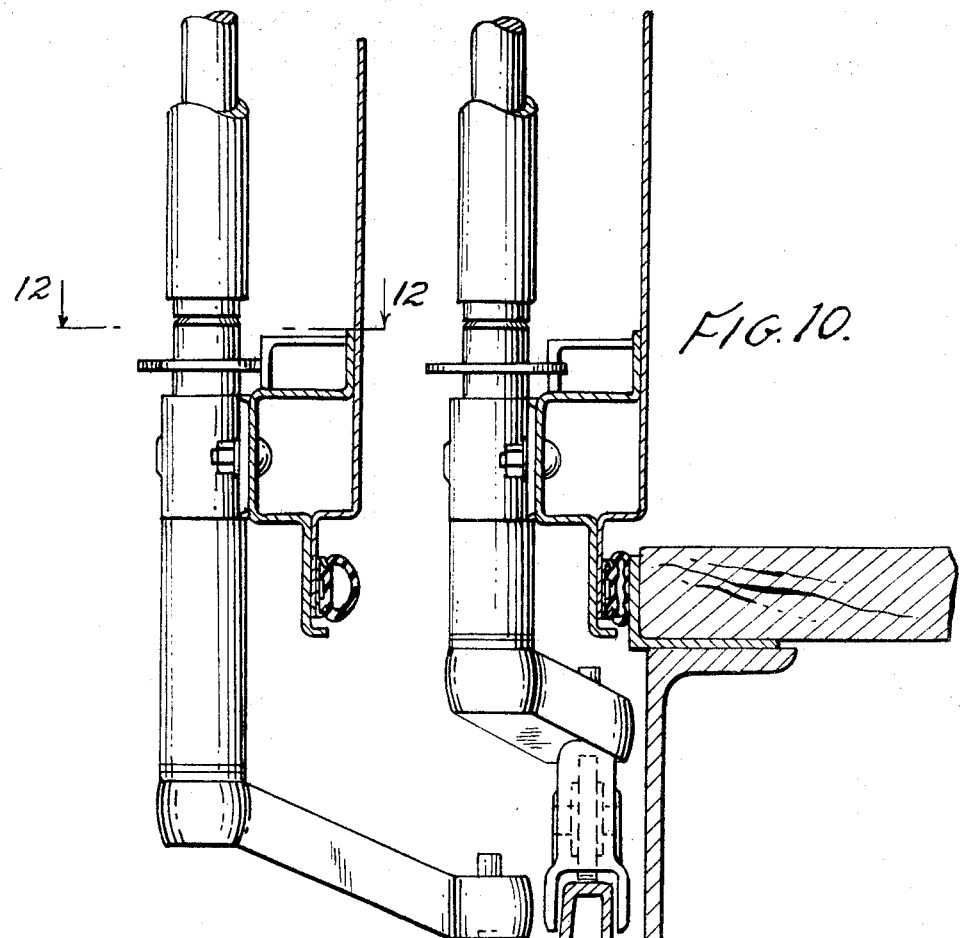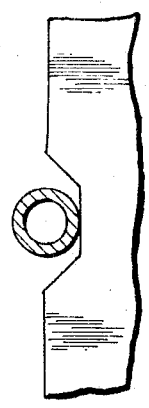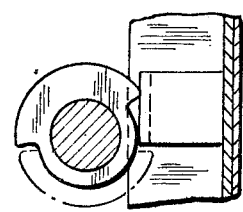

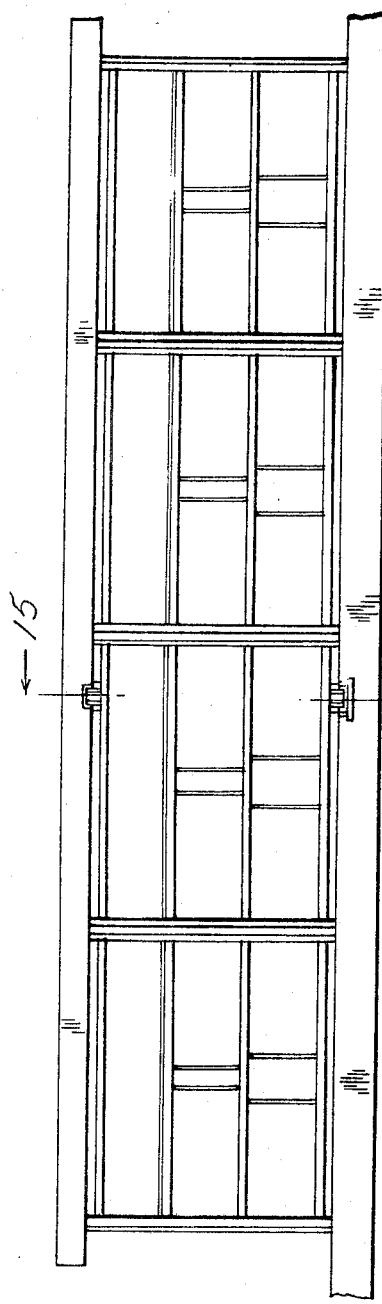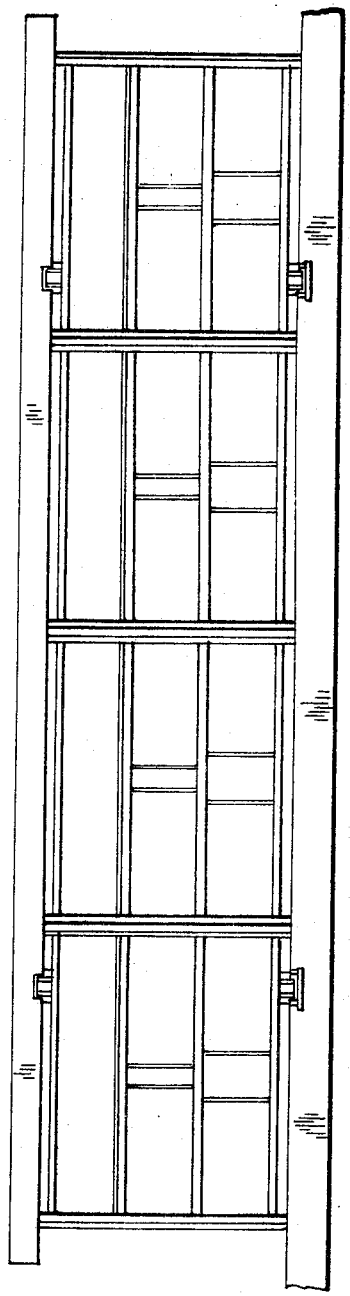

May 19, 1970 T. MADLAND ET AL 3,512,484
ALL-DOOR RAILROAD CAR
Filed Oct. 6, 1967 7 Sheets-Sheet 7

3,512,484
ALL-DOOR RAILROAD CAR
Thorvald Madland, Arlington Heights, and Irving D. Ross, Jr., Barrington, Ill., assignors to The Youngstown Steel Door Company, Cleveland, Ohio, a corporation of Ohio
Filed Oct. 6, 1967, Ser. No. 674,380
Int. Cl. B61d *19/00*
U.S. Cl. 105—378     22 Claims

ABSTRACT OF THE DISCLOSURE

An all-door railroad car is disclosed in which a plurality of plug doors may cooperate to close an opening substantially along the length of the car and generally defined by the side sill, side plate and at least a pair of vertically extending posts. The doors are supported on a pair of tracks attached to the side of the car. Some of the doors are carried on one of the tracks while the remaining doors are carried on the other of the tracks, thereby permitting the doors to be superimposed, one over the other when exposing a variably-positionable door opening. Coplanar sealing surfaces are formed on the side sill and the side plate of the car. Similarly, each of the vertically-extending posts at the ends of the opening of the car includes a sealing surface formed thereon which is substantially coplanar with the sealing surfaces on the side sill and the side plate. Each of the plurality of doors when closing the opening defined by the side sill, side plate, and vertically-extending posts, is in a sealing engagement therewith, as well as with each adjacent door along vertical overlapping edges. Retainer means are provided to retain the top end of the doors in a proper cooperative relationship with the car. An additional support means arrangement is likewise disclosed as comprising brackets on preselected doors designed to be received in recesses in the side plate and side sill to restrain vertical and horizontal shifting of the doors when closed.

BACKGROUND OF THE INVENTION

This invention relates to railroad cars and, more particularly, to an all-door railroad car in which an entire side wall of the railroad car is composed of doors which may be opened in a predetermined order thereby to expose a variably-positionable opening for lading up to one-half of the length of the car. More particularly, this invention relates to an all-door railroad car in which the side walls of the car are comprised of plug doors which cooperate to close an opening substantially along the length of the car which is generally defined by the side sill, side plate and at least a pair of vertically-extending posts.

Two general types of railway car doors are known to the prior art; namely, longitudinally-slidable doors and plug-type doors. Typically, both of these types of doors cooperate with an opening in the side wall of the railroad car which generally is fixedly-positioned and·somewhat less than one-half of the length of the car. Quite often, particularly where the prospective lading of the railroad car warrants particular designs, both of the aforesaid types of doors may be on the order of several feet in width along the length of the car.

While such car doors are generally satisfactory for loading and unloading relatively diminutive objects, or bulk materials such as grain, difficulties arise when it is desired to facilitate the handling of long lading, such as lumber, pipe, lengthy machinery, and the like. It can be readily understood that to facilitate the handling of large-dimensioned lading, it would be desirable to provide as large an opening in the side in the railroad car as possible, while yet retaining the traditional door functions of closing and sealing.

Moreover, to effectuate the rapid loading and unloading of railroad cars, it would be desirable to utilize variably-positionable door openings to obviate the need for respotting the car during the transfer process. It is, of course, most desirable to be able to locate the opening at either end or in the middle of the car. To achieve this end, it is most practicable to eliminate posts in the center of the car side, as well as to obviate the need for posts within the car itself.

Solutions to the problems of maximizing the size of a variably-positionable door opening have primarily been directed to sliding doors. In a typical arrangement, a plurality of sliding doors may be arranged on spaced tracks, and various combinations of the plurality of doors may be transversely moved along the door tracks to provide the opening desired, and in the location desired. In general, such solutions have been constrained to a slidable relationship between the wall of the car and the door structure and between the doors themselves.

One of the difficulties with such a solution, however, is that such mounting of slidable doors requires an abnormal outward projection of the outside track from the wall of the car which is undesirable for reasons which are apparent. Another difficulty is that such arrangements are not susceptible to the desirable sealing arrangements manifested in plug-type doors.

A prior art solution to the problem of the external projection in the case of sliding doors utilizes a combination of plug doors and sliding doors which cooperate to assist in the minimization of the track projection from the side of the car. However, in many instances it is more desirable to utilize the plug door for sealing purposes, as well as for limiting the side projection.

None of the prior art solutions appear to have been directed to the problem of providing a variably-positionable maximum opening in the side of a railroad car wherein all of the doors are plug doors, and wherein substantially the entire side wall of the railroad car door comprises plug doors without the need for additional vertically-extending posts.

SUMMARY OF THE INVENTION

The invention directed to overcoming the shortcomings of the prior art comprises a railroad car in which an opening along substantially the entire length of the railroad car is closed by plug doors which may be selectively opened in predetermined order to expose up to one-half of the length of the car at either end or in the middle thereof. The railroad car includes a side sill and a side plate extending substantially along the length thereof with at least a pair of vertically extending posts at spaced points adjacent opposite ends of the side sill and side plate. The posts extend between the side sill and the side plate and are secured thereto.

Generally coplanar sealing surfaces are formed on the side sill and on the side plate. Each of the vertically-extending posts includes a sealing surface formed thereon which is substantially coplanar with the sealing surfaces of the side sill and the side plate. The side sill, side plate and posts define an opening in the railroad car side wall which extends substantially along the entire length of the car. First and second track means, vertically and horizontally spaced from each other, are provided on each side of the car for supporting the doors and similarly extend substantially along the length of the car and are secured thereto.

A plurality of plug doors are disposed along the side of the car on the tracks for closing the opening defined by the side sill, side plate and vertically-extending posts.

Some of the doors are movably mounted upon the first track means; the remainder of the doors are mounted upon the second track means. Each of the doors is capable of lateral movement into and out from the opening in the car and is further capable of entering into a sealed relationship with an adjacent door when positioned in and thus closing the car side opening. Moreover, the outermost side of each of the end doors is similarly capable of entering into a sealed relationship with a vertically-extending post. In addition, each of the doors is able to enter into a sealed relationship with the side sill and side plate when closing the car side opening. A door mounted on one of the track means is capable of relative movement into register with or past every door mounted upon the other track to provide the opening for lading which is variably-positionable at either end or in the middle of the car.

First and second retainer means are provided on the side sill to retain the tops of the doors in a proper cooperative relationship during withdrawal and movement of the doors. The first retainer means accommodate the top rollers of some of the doors, while the second retainer means act as a retainer for doors intermediate the end doors.

Each of the doors includes rotatable pipes secured to the face thereof and upper and lower cranks at the ends of the pipes for lateral withdrawal of the plug doors from the side of the car. Roller means are provided on the upper cranks adapted to be received behind the retainers. Hanger means are secured to the lower cranks for supporting the railroad car doors on the tracks. In addition, the doors are provided with means for sealing the vertical edges between the adjacent doors.

Additional retainer means are provided on certain of the doors to restrain vertical and horizontal shifting of the door in the form of a keeper plate having a laterally extending portion thereon. The protrusions are designed to be received in pockets or recesses in the side sill and side plate to provide an additional measure of stability thereon.

The aims of the invention are achieved without using additional vertically-extending posts in the side of the car at a position intermediate the pair of vertically-extending posts which, taken with the side sill and side plate, define an uninterrupted side wall opening. Moreover, railroad cars utilizing the invention are further characterized by the absence of posts between the floor and roof of the car within the car itself. Thus, the area for lading is easily accessible and largely uninterrupted.

Accordingly, it is an object of this invention to provide an all-door railroad car having a plurality of plug doors capable of closing an opening along substantially the length of the car.

It is a further object of this invention to provide a railroad car in which an entire side wall of the railroad car is comprised of plug doors which may be opened in a predetermined order to expose up to one-half of the length of the car, while yet providing an opening for loading or unloading which may be positioned at either end or in the middle of the car.

It is a still further object of this invention to provide a railroad car door which maximizes the area of opening for entry into the car while yet minimizing the outward projection of the door tracks from the car.

It is a still further object of this invention to provide a railroad car having a side sill, side plate and vertical posts extending therebetween, each of the aforesaid elements having sealing surfaces formed thereon which are substantially coplanar, said side sill and side plate and posts defining an opening into which are inserted a plurality of plug doors along the entire length of the railroad car to close the opening.

It is a still further object of the invention to provide, in cooperation with an all plug-door railroad car, a plurality of tracks spaced apart both vertically and horizontally so that the plug doors may be withdrawn from the opening in the side of the railroad car and laterally traverse the side of the car.

It is a still further object of this invention to provide an all-door railroad car in which a plurality of plug doors may be laterally withdrawn from the side of the car and moved transversely of the car in such a manner that up to one-half of the length of the railroad car may be exposed at one time, the positioning of the opening being variable from either end of the railroad car.

These and other objects of the invention will become apparent upon a further perusal of the specification which follows, taken in connection with the accompanying drawings.

BRIEF DESCRIPTION OF THE DRAWINGS

In the drawings:

FIG. 1 is a side elevational view of a railroad car employing a car construction in accordance with the instant invention;

FIG. 2 illustrates schematically the overlapping arrangement of the doors when closing the opening in the side wall of the car;

FIGS. 3, 4 and 5 are schematic illustrations, similar to FIG. 2, illustrating the various combinations of doors which may be opened and alternative positions of the opening for lading when the doors are opened in predetermined order;

FIGS. 6 and 6A are contiguous and illustrate a sectional view taken along line 6—6 of FIG. 1 depicting the sealing arrangements on the doors;

FIG. 7 is a partial side elevational view of one of the doors depicting the operating mechanism for the door;

FIG. 8 is a sectional view taken along line 8—8 of FIG. 1;

FIG. 9 is a sectional view taken along line 9—9 of FIG. 1;

FIG. 10 is a partial end elevational view of two of the doors superimposed one over the other;

FIG. 11 is a sectional view taken along line 11—11 of FIG. 9;

FIG. 12 is a sectional view taken along line 12—12 of FIG. 10.

FIG. 13 is a schematic partial side elevational view similar to FIG. 1 which illustrates an alternative embodiment for the support means to restrain vertical and horizontal shifting of a door when positioned in the side wall opening;

FIG. 14 is a schematic view similar to FIG. 13, depicting the alternative support means arrangement applied to a pair of doors;

DETAILED DESCRIPTION OF THE DRAWINGS

Figure 16:
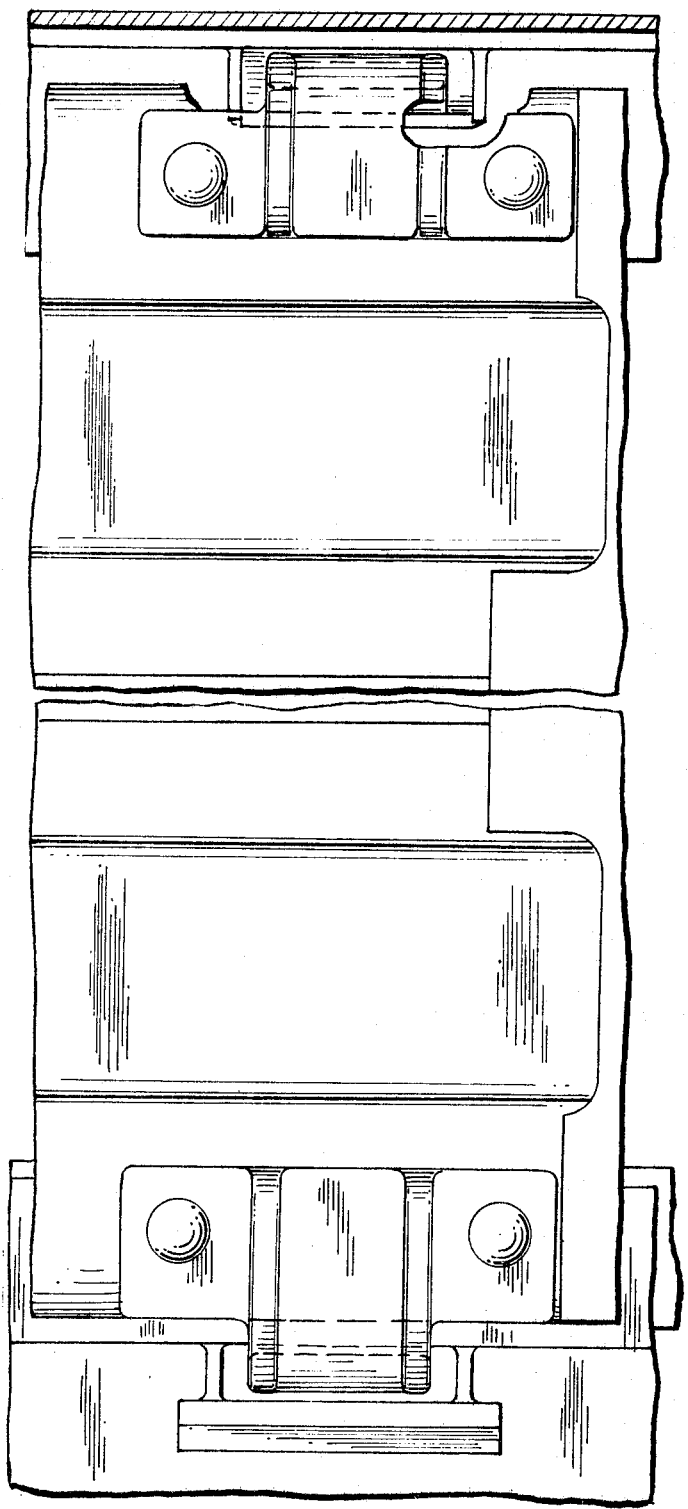
FIG. 16 is a fragmentary front elevational view of the arrangement shown in FIG. 15.
Figure 15:
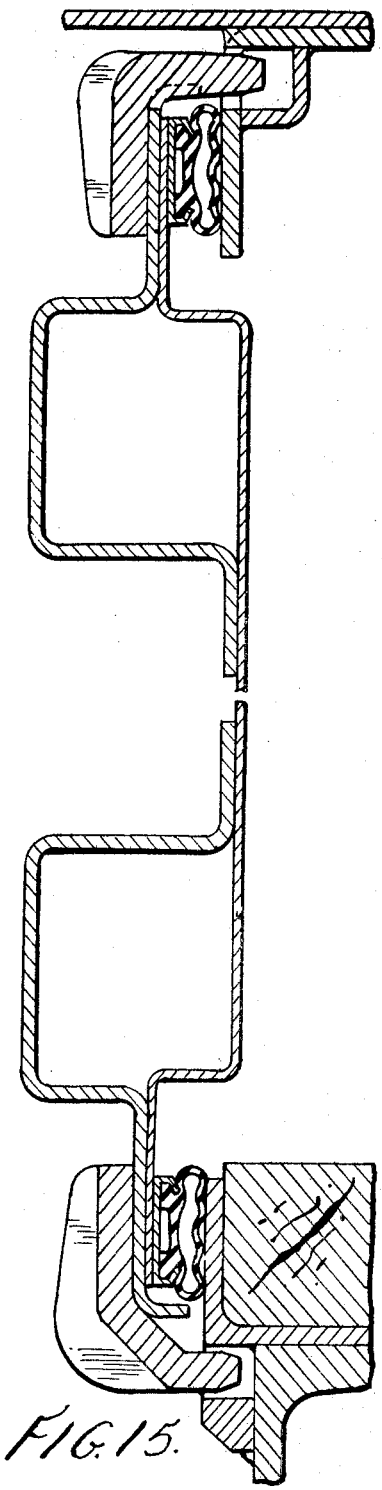
FIG. 15 is a sectional view taken along line 15—15 of FIG. 13.

As can be seen in FIG. 1, a railroad car according to the invention is shown generally at 10 as comprising a plurality of doors 14, 15, 16, and 17. Each of the doors is of a similar construction and includes top, center, and bottom panels or sheathing 20 which are interconnected and reinforced by horizontal channels 21 at the top and bottom thereof, as well as across the center of the door.

The combination of railroad car 10 includes a side plate 11 and a side sill 12, each of which extend substantially along the length of the car. Each car 10 includes at least a pair of vertically extending posts 18 at spaced points adjacent opposite ends of side sill 11 and side plate 12 and which further extend therebetween. It can thus be understood that posts 18, side sill 11 and side plate 12 define a single opening in the side of railroad car 10, which likewise extends along substantially the entire length thereof. In the preferred form, vertically-extending posts 18 are corner posts of the car.

First and second track means, designated 41 and 42 respectively, are spaced from each other, preferably both horizontally and vertically, and extend along substantially the length of railroad car 10. The track means may be secured to the side sill 12, as depicted, or attached to the car in other conventional fashion.

Doors 14, 15, 16, and 17 are thus disposed along the side of car 10 for closing the opening defined by posts 18, side sill 11, and side plate 12. As will hereinafter be discussed in greater detail, some of the doors, for example 14 and 17, are movably mounted on the first track means 41 and the remainder of the doors, for example, 15 and 16, are movably mounted on the second track means 42.

Each of the doors 14, 15, 16, 17 is capable of lateral movement into and out from the opening in the side of the car. Moreover, each of the doors, as will hereinafter be discussed in greater detail, is further capable of entering into a sealed relationship with an adjacent door, when in the opening, to provide a complete closure.

As can best be seen in FIG. 7, each door further includes a pair of rotatable pipes 24 and 25 which are rotatably secured to the face of the doors through appropriate brackets 26. The pipes include upper and lower cranks disposed at or near the ends of each of said pipes. Lower rotatable cranks 27 are depicted in FIG. 7 at the bottom end of each of the pipes 24 and 25 with the cranks being received on roller equipped hanger means 28 securely connected to lower cranks 27. Hanger means 28 support the door on either one of the first and second track means 41 and 42, depending upon to which door the operative assembly is applied. In the embodiment depicted, the door is disposed on track means 41 and is representative of doors 14 and 17.

Similarly, as best seen in FIGS. 8 and 9, each of the pipes 24 and 25 have an upper crank 29 supporting roller means 30 attached thereto. Roller means 30 are adapted to be received behind first and second retainer means as will be further discussed hereinafter.

Returning to FIG. 7, means are shown generally at 32 for actuating rotatable pipes 24 and 25 to withdraw the doors from the opening in a predetermined order. It can be understood that an operating mechanism similar to 32 or equivalent thereof is supported on each of the doors for the desired purpose.

In the particular embodiment shown in FIG. 7, connecting rods 33 are secured at one end thereof by clevis 34 which respectively attaches to pipes 24 and 25. Rods 33 are connected, at the ends opposite clevis 34, to a rotatable gear segment 36 which is rotatably supported on the door panel 20.

An operating handle 37 is secured to a shaft 38 which is rotatably supported on the door adjacent to the gear segment 36 and which further includes a gear pinion 39 secured to shaft 38 in a meshing engagement with gear segment 36.

It will be appreciated that rotation of the handle 37 causes rotation of gear segment 36 through the meshing engagement with pinion 39 thereby causing a reciprocal movement of the connecting rods 33 and a corresponding rotation of pipes 24, 25.

As best observed in FIG. 9, first and second track means 41 and 42 are provided to support each of the doors 14, 15, 16, and 17 on the railroad car 10, and are secured to side sill 12 by track supporting brackets 43 and 44 respectively. Bracket 43 is spaced vertically from bracket 44 and is of lesser horizontal length, with the result that track means 41, mounted upon bracket 43 is spaced upwardly and inwardly of track means 42.

It can be seen that a door mounted on one of the track means 41 and 42 is capable of relative movement into register with or past every door mounted on track means 42. The extent of lateral movement of each of the doors mounted on track means 41 is equal to the extent of lateral movement of every other door mounted upon the same track and is different from the extent of lateral movement of the doors mounted on track means 42.

FIG. 2 depicts doors 14, 15, 16, and 17 when in a closed position within the opening defined by side plate 11, side sill 12, and vertically extending posts 18.

FIG. 3 diagrammatically depicts the movement and relationship of the doors when it is desired to form an opening for loading and unloading at the center position of the side wall opening. To achieve this configuration, door 16, which because of its particular gasketing arrangement differs from doors 14, 15, and 17, as can be seen in FIG. 6A, is removed from the opening and slidably moved beyond door 17 along track means 42. The particular relationship of the mechanical parts is such to permit the desired clearances between the doors. Upon removal of door 16 from the side wall opening, door 15, similarly mounted on track means 42, is laterally withdrawn from the opening and slidably moved along track means 42 until it is in register with door 14. Thus, the lading opening is defined by the opening formerly occupied by doors 15 and 16.

FIG. 4 depicts the relationship of the movements of the doors when it is desired to form an opening at the right-hand end of the car. In this embodiment, door 16 is removed from the opening, as in FIG. 3, and moved axially toward door 17 along track means 42 sufficiently far to permit withdrawal of door 15 from the opening. Door 15, after withdrawal, is transversely moved along track means 42 until it is in register with door 14. Thereafter, doors 16 and 17 are movably positioned in register with each other and adjacent doors 14 and 15 along track means 41 and 42 respectively, to achieve the desired relationship.

FIG. 5 depicts still another door relationship in which the door opening is positioned at the left-hand end of the railroad car side wall. Door 16 is withdrawn from the opening and transversely moved along track means 42 until it is in register with door 17. Door 15 is likewise removed from the opening and transversely moved along track means 42 until it is adjacent door 16. Thereafter, door 14 is transversely moved along track means 41 until it is in register with door 15 and positioned adjacent door 17.

It can thus be seen from FIGS. 2–5 that the positioning of the door opening is movably positionable along the side wall, depending upon which combination of doors is removed and in the particular combination in which the doors are ultimately positioned.

As can best be seen in FIGS. 8 and 9, side sill sealing angle 46 which defines a bottom door header, also supported on the side sill 12, is spaced vertically above the tracks 41 and 42. The angle 46 is secured to the upper leg 47 of the side sill 12 and extends substantially along the entire length of the railroad car. The angle 46 supports the flooring 48 of the car and defines a sealing surface 49 at its outer face.

A sealing angle 50, best illustrated in FIGS. 6 and 6A, and similar to the sealing angle 46, is attached to each of the vertically-extending posts 18. The sealing angle 50 includes a sealing surface 51 which is substantially coplanar with the sealing surface 49 formed on the sealing angle 46.

The sealing structure of side plate 11 is best illustrated in FIGS. 8 and 9 and comprises an essentially channel-shaped member extending along substantially the length of the railroad car. The channel-shaped member is defined by a vertically-extending web 60 which includes an upper leg 61 which extends generally transverse thereto. Upper leg 61 is also designed to support the roof (not shown) of the railroad car, and further includes a downwardly-turned vertically-extending flange 62.

The other end of the web 60 has a transverse leg 63 with a downwardly-turned flange 64. The flange 64 defines a sealing surface which is generally coplanar with the aforementioned sealing surface 49 on the sealing angle 46 carried by the side sill and the sealing surfaces 51 on the angles 50 carried by the end corner posts 18.

Thus, it can be seen that the opening defined by the side plate 11, side sill 12 and vertically-extending posts 18 is further characterized by generally coplanar sealing surfaces 64, 46 and 50 respectively. When closing the opening thus defined, doors 14, 15, 16, and 17 define a side wall sealed about its periphery by the aforementioned sealing surfaces.

To provide additional vertical guidance for rotatable pipes 24 and 25, a generally horizontally extending plate 67 may be secured to transverse leg 63. As can be seen in FIG. 11, plate 67 is suitably notched to provide some measure of additional vertical guidance for pipes 25.

Secured to the outer surface of the web 60 at a position intermediate the length thereof, is an inverted channel-shaped member 65 which also extends along substantially the entire length of the railroad car. The inverted channel 65 comprises a first top retainer designed to accommodate the roller 30 carried by the end doors 14 and 17. The upper flange 62 on the transverse leg 61 serves as a top retainer for the rollers 30 on interior doors 15 and 16 in the manner shown in FIG. 9.

A stop member 68 interconnects the flange 62 with the outer leg 66 of the retainer 65 at a point near either end of the side plate, and serves as a stop to prevent the travel of the car door beyond the end of the retainer. As heretofore described, the sealing surface 64 along the top, the sealing surface 49 along the bottom side sill, and the sealing surface 51 along the vertical edge at either end of the car, serve to define an opening which, in size, substantially corresponds to the interior of the railroad car. To provide means for closing this opening, the doors are designed to cooperate with each other to define what is, in effect, an all-door side wall for the car. Thus, referring to FIGS. 8 and 9, each of the doors 14, 15, 16, and 17 include a compression gasket 70 which extends along the bottom and top edges and which is designed to engage with the sealing surfaces 49 and 64 respectively, when the door is positioned in the opening defined between the side sill 12 and the side plate 11.

In addition, the doors are designed to cooperate in sealing the vertical edges between the adjacent doors. Thus, referring to FIGS. 6 and 6A, it will be seen that each of the doors includes a gasket supporting flange 71 defined by one leg of the vertical reinforcing channel 22 along one edge of the door. The flange 71 is laterally offset outwardly from the plane of the panels 20 defining the door with a compression gasket 70 carried by this flange. The flange 71 is formed on the left edge of doors 14 and 15, as viewed in FIGS. 2 and 6, and on the right edge of door 17, while door 16 has the flange construction 71 and compression gasket 70 formed on both the left and right vertical edges.

The doors 14, 15, and 17 have a somewhat different construction than door 16 along the other vertical edge which comprises a flange or backing member 72 defined by the vertical reinforcing member 22 with the flange 72 being essentially in the same plane as the plane of the panels 20 on the doors.

It will be appreciated that with the doors 14, 15, and 17 received in the door opening, the flanges 72 will be in essentially the same plane as the plane of the sealing surfaces 49, 51, and 64, thus defining what is, in essence, a vertical sealing surface along which the compression gasket carried by the adjacent door may abut. With this arrangement, the doors, may be placed in overlapping engagement as schematically illustrated in FIG. 2 thereby providing a weather-tight seal along not only the top and bottom edges of the doors, but also along the vertical edges between the doors.

To provide means whereby the doors may be positioned to expose up to one-half of the length of the side wall of the car, it is contemplated that certain of the doors will be supported on track 41 and employ top retainer 65 while others of the doors will be supported on track 42 and employ the top retainer 62. Referring first to the doors supported on track 42, it is contemplated that the two center or interior doors, 15 and 16, will be so supported. To accommodate the greater vertical distance between the retainer 62 and the track 42 compared to the distance between the retainer 65 and the track 41, it is apparent that the pipes 24 and 25 will be greater in length than the pipes employed on the doors supported on track 41. Similarly, the end doors 14 and 17, which are supported on track 41, must employ upper end cranks which are greater in axial dimension than the upper and lower cranks on the doors 15 and 16 to accommodate the inward position of the top retainer 65 relative to the top retainer 62. Conversely, the doors 15 and 16 must employ lower cranks which are greater in axial dimension than the lower cranks for the doors 14 and 17 to accommodate the outward position of the track 42 relative to the track 41.

Thus, it can be seen that, in a preferred form, the extent of lateral movement of the doors mounted on one track is equal to the extent of lateral movement of every other door mounted on that particular track and is different from the extent of lateral movement of the doors mounted on the other track.

It has been further found desirable to provide door stops for each of the doors 14, 15, 16, and 17. One suitable means, as illustrated in FIGS. 8 and 9, is to secure notched annular discs 81 to each of the rotatable pipes 24 and 25. Door stop 82 which may assume an annular shape is secured to the door. As can be seen in FIG. 12, when a door, such as one provided on track means 42, is in the open position, shoulder 83 of the notched annular disc 81 is in contact with the door stop member 82 to provide the desired stopping action.

FIG. 10 has been provided for clarity to show a door such as 15 or 16 mounted on track means 42 which has been removed from the opening and movably traversed to position in register with an end door mounted on track means 41, for example door 14 or 17. As heretofore described, the extent of lateral movement permitted by the dimension of crank arm 27 is sufficient to permit movement into the described register. Moreover, it can be seen that the door stop on the outermost door is in contact with the stop member 82, while the inner door is not in contact with its door stop.

Since there are no door posts to position the doors other than the end corner posts 18, it is necessary that each door be accurately aligned in position when closing the door.

FIGS. 13–16 illustrate an additional support means 85 which may be provided for retaining the doors in a proper cooperative relationship and to provide support therefor.

Recesses or pockets 86 are provided in both the side sill 12 and side plate 11 to restrain vertical and longitudinal shifting of a door or doors relative to the car or to each other. It has been found satisfactory to provide such pockets or recesses 86 in the top or bottom of any single door. This embodiment is illustrated in FIG. 13 in which the recesses or pockets 86 are in relative vertical alignment and provided near the centermost portion of door 15.

Where desired or necessary, for additional strength, similar additional retainer means 85 comprising substantially vertically aligned recesses 86 may be provided near the innermost portions of the end doors 14 and 17, as can be seen in FIG. 14.

In the lowermost portion of the door to which additional retainer means 85 are secured, a keeper plate 87 is secured to the flange of the door to which gasket 70 is attached. Plate 87 includes a portion 89 secured to the door and a portion 90 protruding therefrom generally transverse thereto for insertion into pocket 86. In the lowermost portion of the door, pocket 86 is defined by a suitable facing plate 92 having generally parallel walls 93 transverse thereto to form the pocket. Facing plate 92 is secured to side sill 12 in a conventional manner, and in the preferred embodiment, the pocket 86 thus formed lies substantially parallel to leg portion 47 of side sill 12. When closed, portion 90 of the keeper plate 87 resides in pocket 86 in the manner illustrated.

Similarly, in the uppermost portion of the applicable door, a similar keeper plate 87 comprising generally perpendicular portions 89 and 90 is secured to the door. Pocket 86 is formed in the downwardly-extending plate 64 immediately above the sealing surface similarly formed therein. When closed, laterally extending portion 90 resides in the pocket.

By this additional support construction, the doors are constrained against longitudinal and vertical shifting.

The invention claimed is:

1. In a railroad car the combination comprising:
   a side sill,
   a side plate, said side sill and side plate extending substantially along the length of said railroad car,
   at least a pair of vertically extending posts at spaced points adjacent opposite ends of said side sill and side plate and extending therebetween, said posts being secured to said side sill and said side plate, said posts, side sill and side plate defining a single opening in said railroad car extending along substantially the entire length thereof,
   first and second track means spaced from each other extending along substantially the length of said railroad car and secured thereto,
   a plurality of doors disposed along the side of said railroad car for closing said opening, some of said doors being movably mounted on one of said track means, the remainder of said doors being movably mounted on the other of said track means,
   each of said doors further being capable of lateral movement into and out from said opening and further being capable of entering into a sealed relationship with an adjacent door when in said opening to provide a closure,
   a door mounted on one of said tracks being further capable of relative movement into register with or past every door mounted on said other track.

2. The combination as defined in claim 1 wherein said single opening defined by said side plate, said side sill, and said pair of vertically-extending posts is further characterized by the absence of additional vertically-extending posts intermediate said pair.

3. The combination as defined in claim 1 wherein said car is further characterized by the absence of vertically-extending posts between the floor of said car and the roof of the said car in a position intermediate the area defined by the sides and ends of the car.

4. The combination as defined in claim 1 wherein the extent of lateral movement of the doors mounted on one track is equal to the extent of lateral movement of every other door mounted on said one track and different from the extent of lateral movement of the doors mounted on the other track.

5. The combination as defined in claim 4 wherein said vertically-extending posts are corner posts.

6. The combination as defined in claim 1 further including:
   substantially coplanar sealing means formed on each of said side sill and said side plate,
   a sealing surface on each of said posts substantially coplanar with said sealing means on said side sill and side plate,
   each of said doors including sealing means extending along the bottom and top edges thereof to engage said sealing means on said side sill and said side plate respectively when said doors are positioned in said opening.

7. The combination of claim 6 wherein the sealing means on each of said doors extending along the bottom and top edges thereof comprises a compression gasket.

8. The combination as defined in claim 6 wherein said sealing means on said side sill includes a side sill sealing angle defining a door bottom header, said angle being secured to said side sill and extending substantially along the entire length thereof,
   said angle further defining a sealing surface at its outer face.

9. The combination as defined in claim 8 wherein said sealing surface on said posts is defined by a sealing angle secured to each of said vertically-extending posts, said sealing angle including a sealing surface which is substantially coplanar with the sealing surface defined by said side sill sealing angle.

10. The combination as defined in claim 9 wherein said side plate comprises a generally channel-shaped member extending along substantially the length of said railroad car,
    said channel-shaped member being defined by a web and a leg extending generally transverse to said web, said leg adapted to support the roof of said railroad car,
    said leg including a first flange, the other end of said web including a second leg and a second flange, said second flange defining a sealing surface substantially coplanar with said side sill sealing surface and said vertical post sealing surface.

11. The combination as defined in claim 1 further including first and second retainer means for retaining the tops of said doors in a proper cooperative relationship during withdrawal and movement of said doors.

12. The combination as defined in claim 11 wherein said first retainer means are adapted to accommodate the rollers on the top end of the doors at either end of said car and said second retainer acts as a retainer for doors intermediate said end doors.

13. The combination as defined in claim 12 further including stop members secured to said first and second retainer means to prevent the travel of the car door beyond the end of said first and second retainer means.

14. The combination as defined in claim 11 wherein each of said doors includes rotatable pipes secured to the face thereof,
    upper and lower cranks at the ends of each of said pipes,
    roller means on the upper cranks adapted to be received behind said first and second retainer means,
    hanger means secured to said lower cranks for supporting said doors on said first and second track means, and
    means for actuating said rotatable pipes to withdraw said doors from said opening in a predetermined order.

15. The combination of claim 1 wherein each of said doors includes door edge sealing means for sealing the edges between adjacent doors when said doors are positioned in said opening.

16. The combination as defined in claim 15 wherein said door edge sealing means includes:
    gasket support flanges,
    gaskets secured to said flanges in such a manner that said doors may be selectively withdrawn from said opening in a predetermined order.

17. The combination as defined in claim 16 wherein said gaskets are substantially coplanar with said sealing means of said side sill and said side plate and said sealing surfaces on said posts when said doors are in place in the opening of said car.

18. The combination as defined in claim 14 further including door stops, said door stops comprising:
    notched annular discs connected to said rotatable pipes,
    a notched portion thereof forming a shoulder,
    a door stop member secured to said door in such a manner that when the door is open, the shoulder of said notched annular discs is in contact therewith to provide the desired door stop action.

19. The combination as defined in claim 1 further including support means for restraining vertical and longitudinal shifting of the doors relative to the car.

20. The combination as defined in claim 19 wherein said support means includes at least a pair of substantially vertically-oriented recesses on said car,
means secured to said door and protruding therefrom for insertion into said recess when said door is closing said opening.

21. The combination as defined in claim 20 wherein said means secured to said door are provided on an intermediate door.

22. The combination as defined in claim 21 wherein said means secured to a door are provided on at least a pair of doors.

References Cited
UNITED STATES PATENTS

| | | | |
|---|---|---|---|
| 3,190,239 | 6/1965 | Davis et al. | 105—378 |
| 3,191,548 | 6/1965 | Adler et al. | 105—378 |
| 3,191,549 | 6/1965 | Adler et al. | 105—378 |
| 3,233,561 | 2/1966 | Yelin | 105—378 |

ARTHUR L. LA POINT, Primary Examier

R. A. BERTSCH, Assistant Examiner

Patent No. 3,512,484

Certificate of Correction

May 19, 1970

Thorvald Madland et al.

It is certified that error appears in the above-identified patent and that said Letters Patent are hereby corrected as shown below:

In the drawings, Sheet 7, cancel "FIG. 16" and insert the corrected figure:

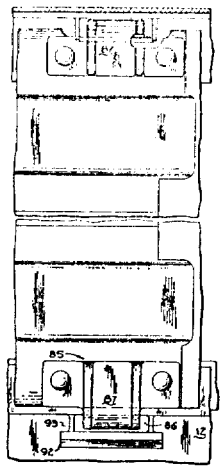

FIG. 16.

Signed and sealed this 26th day of January 1971.

[SEAL]

Attest:

EDWARD M. FLETCHER, JR.,
Attesting Officer.

WILLIAM E. SCHUYLER, JR.,
*Commissioner of Patents.*